Figure 1:
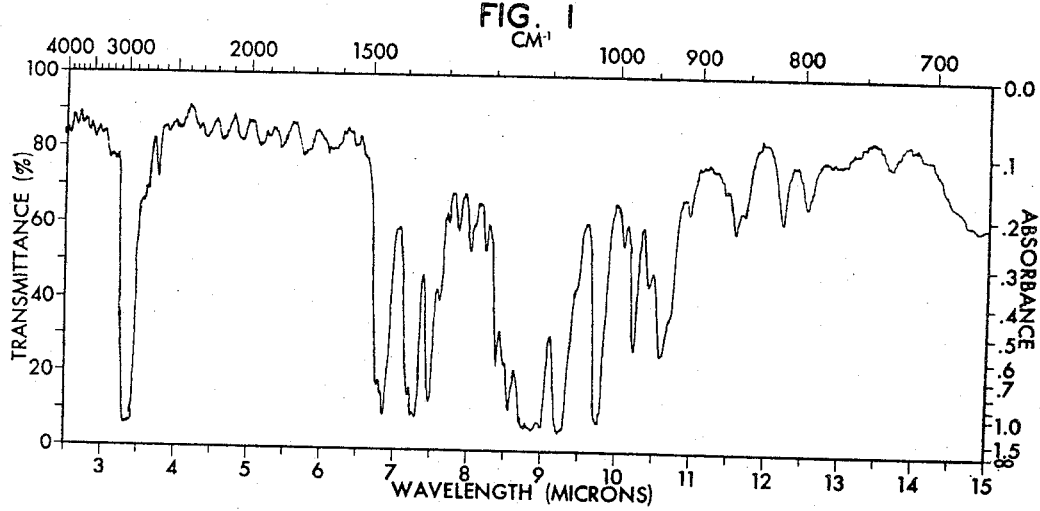

Nov. 21, 1967  B. J. KANE  3,354,225

NOVEL CAMPHANE DERIVATIVES

Filed Jan. 27, 1965

INVENTOR
BERNARD J. KANE

BY Harold N. Baum

ATTORNEY

3,354,225
NOVEL CAMPHANE DERIVATIVES
Bernard J. Kane, Atlantic Beach, Fla., assignor to The Glidden Company, Cleveland, Ohio, a corporation of Ohio
Filed Jan. 27, 1965, Ser. No. 428,382
3 Claims. (Cl. 260—611)

The present invention relates to novel compositions. The invention more particularly relates to a class of novel camphane derivatives having unexpectedly advantageous odor characteristics and to compositions containing these derivatives.

Cedar oil (sometimes termed cedar wood oil or cedar leaf oil, depending upon the source from which it is obtained) is well known in commerce as a valuable essential oil which is used to impart a cedar-like odor to a variety of compositions such as, for example, furniture polishes, paint, soaps, insect repellants, disinfectants, shoe dressings, floor waxes, auto waxes, aerosol compositions employed to mask airborne odors, and the like. Like many other essential oils cedar oil has insect repellent and antiseptic properties.

The composition of cedar oil has been disclosed by Ruzicka et al. in Annalen, vol. 471, page 40, published in 1929, by Blumann et al. in an article in Berichte, vol. 64, page 1540, published in 1931, Ruzicka et al. in an article in Helvetica Chimica Acta, vol. 19, page 322, published in 1936 and in Hackh's Chemical Dictionary, Third Edition, page 176, published by McGraw-Hill Book Company in 1944. According to these publications, cedar oil is composed primarily of (1) a liquid portion consisting of cedrene, a compound having the empirical formula $C_{15}H_{24}$ and (2) a solid crystalline portion consisting of cedrol, a compound having the empirical formula $C_{15}H_{26}O$.

Cedar oil is obtained commercially from the leaves or wood of cyprus and cedar trees (*Juniperus virginiana*) or from wood of the West Indies and South America tree (*Cedrela odorata*) by expensive time-consuming extraction and distillation procedures such as those procedures conventionally employed in the production and manufacture of essential oils which are obtained from natural sources.

The present invention provides a restricted novel class of compounds distinctly different from cedrene, cedrol or mixtures thereof. The novel class of compounds can be economically synthesized and these compounds have odor and other properties which will enable them to replace the difficulty obtainable cedar oil in areas of commerce and in compositions where cedar oils are presently employed. The novel componds of the present invention are camphane derivatives and are analogs, homologs or isomers of known compounds. However, known homologs or analogs of the present novel class of compounds have an odor unlike and distinctly different from the cedar odor of cedar oil and the cedar odor of the novel class of compound herein described.

The novel class of compounds of this invention are of the formula

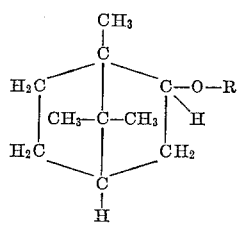

where R is selected from the group consisting of

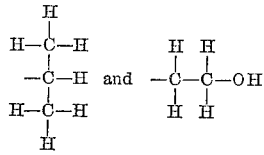

One of the compounds falling within the scope of the above formula is 2-isopropoxycamphane, a compound characterized in having a boiling point of 138° C. at 100 mm. pressure and 84° C. at 10 mm. pressure, a specific gravity of 0.882 and an index of refraction ($n_{15}$) of 1.4538. Additionally 2-isopropoxy-camphane is characterized in having a distinct, different, infrared absorption pattern. FIG. 1 represents the infrared absorption pattern of 2-isopropoxy-camphane obtained using the apparatus and procedure described in The Instruction Manuals, 990–9000–1, published by The Perkin-Elmer Corp., Norwalk, Conn.

Figure 2:
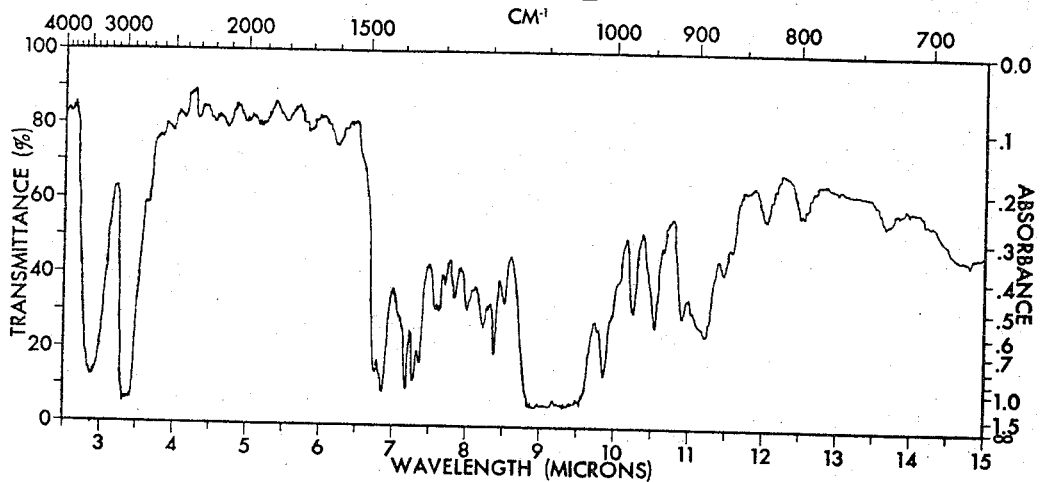

Another novel compound of this invention falling within the scope of the above formula is 2-($\beta$-hydroxyethoxy)-camphane. This compound is characterized in having a boiling point of 121° C. at 10 mm. of pressure and a boiling point of 86° C. at 1 mm. pressure, a specific gravity (25/25) of 0.990 and an index of refraction ($n_{15}$) of 1.4800. Additionally this compound has a distinct, infrared absorption pattern which is different from the infrared absorption spectra of cedar oil or 2-isopropoxy-camphane. FIG. 2 represents an infrared absorption pattern of 2-($\beta$-hydroxyethoxy)-camphane obtained using the apparatus and procedure described in the preceding paragraph.

The above compounds, while distinctly different in structure, chemical and physical properties from the compounds associated with cedar oil, surprisingly have the odor and insect repellency commonly associated with that material. The novel camphane derivatives of this invention also, surprisingly, have an odor distinctly different from known analogs and homologs of these camphane derivatives. Thus, for example, 2-methoxycamphane disclosed by Simonsen on page 367 of Vol. II of "The Terpenes" published by Cambridge University Press in 1949 has a camphoraceous odor. Other related compounds including 2-ethoxy-camphane, 2-n-propoxy-camphane, 2-isobutoxy-camphane, 2-n-butoxy-camphane, 2,2-butoxy-camphane, 2-n-hexoxy-camphane, 2-($\beta$-methoxy-ethoxy)-camphane, 2-cyclohexoxy-camphane and 2-tetrahydrofurfuroxy-camphane generally have either a camphoraceous or an unpleasant odor in contrast to the pleasant odor of natural cedar oil and the pleasant cedar odor of the novel compounds of this invention. Other known, related compounds have been disclosed by Simonsen on page 448 of Vol. II of "The Terpenes," above referred to, including 2-ethoxybornylene and a bornylene ethyl ether prepared from the enol of camphor. These compounds are also characterized in having a camphoraceous rather than a cedar odor. The compound 2-methoxy-camphane which also has a camphoraceous odor is disclosed in reports in the Association of Camphor Industry Engineering of Japan Report No. 21, page 188, published in 1956.

The known compounds above referred to are chemically closely related to camphor and expectedly have a camphoraceous or camphor-like odor which does not suggest and is not otherwise identifiable with cedar oil or the odor of cedar oil. Therefore, it is unexpected that an analog and isomer of one of the compounds (e.g. 2-iso-propoxy-camphane) of this invention, specifically 2-n-propoxy-camphane has a camphoraceous odor whereas 2-isopropoxy-camphane has a cedar odor. As noted above, homologs of compounds falling within the scope of the above formula, for example 2-ethoxy-camphane, the position isomers of 2-butoxy-camphane and the position isomers of 2-pentoxy-camphane have a camphoraceous or camphor-like odor. Surprisingly the specific compounds of this invention, 2-β(hydroxyethoxy)-camphane and 2-isopropoxy-camphane unexpectedly have an odor which is indistinguishable from the odor of cedar oil.

As noted hereinbefore, cedar oil is substantially a mixture of two compounds which are distinct and different from the novel compounds of this invention. The compounds of this invention can be used to replace the relative expensive cedar oil as an industrial odorant or as an odor-masking agent. In view of their ease of preparation and the low cost involved therein, the novel compounds of this invention have a particular economic advantage over the natural cedar oils.

The compounds of the present invention may be prepared by reacting camphene with an appropriate alcohol (e.g. isopropyl alcohol or ethylene glycol), in the presence of a suitable catalyst. Suitable catalysts include mineral acids such as, for example, phosphoric and sulfuric acids and water insoluble, strong cation exchange resins. These cation exchange resins are porous electrolytes having an enormous nondiffusable anion and a single diffusable cation. Such cation exchange resins include, for example, those cation exchange resins described in U.S. Patents Nos. 2,340,111, 2,366,007, and 2,366,008. It is preferred that the cation be a sulfonic acid group which includes nuclear sulfonic acid groups as well as alkylene sulfonic acid groups. Examples of strong sulfonic acid cation exchange resins include the water insoluble phenolic methylene sulfonic resins such as those obtained by reacting phenol, formaldehyde and a methylene sulfonic acid or an alkali metal sulfite, for example, the resins described in U.S. Patent No. 2,477,328. Other preferred strong cation exchange resins are the water insoluble, vinyl aromatic, polymer-containing nuclear sulfonic acid groups such as those described in U.S. Patent No. 2,366,-007 hereinbefore referred to.

One of the preferred cation exchange resin catalysts is the water insoluble aromatic hydrocarbon copolymer solid of a monovinyl hydrocarbon (e.g. styrene) and a polyvinyl aromatic hydrocarbon (e.g. divinyl benzene) containing a plurality of nuclear sulfonic acid groups. The preparation of such resins and the chemical constitution thereof is described in U.S. Patents Nos. 2,466,675 and 3,037,052. Generally, cation exchange materials which have a titration curve similar to that shown in FIG. 1 on page 88 of "Analytical Chemistry," vol. 21, 1949, are satisfactory.

The cation exchange resins are preferably composed of particles which have a bead shape and which are porous and the more highly porous materials are particularly preferred. Since catalytic activity of these materials does not depend upon the occurrence of an ion exchange process during catalysis in the preparation of the novel compounds of this invention, the activity of these materials will decrease if the hydrogen ions are replaced by other cations. Accordingly, it is desirable that cations other than hydrogen ions be eliminated insofar as possible in processes in which the compounds are prepared.

The size and shape of the cation exchange resins, when employed, is preferably such that substantially all of the particles are spherical and will pass through a No. 16 mesh U.S. Standard Screen and substantially all of the particles will be retained on a No. 60 mesh U.S. Standard Screen. Particles of such size will readily permit the flow of reaction liquids through the catalyst, when in the form of a fixed bed, permitting uninterrupted practice of the process. The cation exchange resins should be substantially water-free, that is, they should contain less than 1% by weight of moisture.

Specific examples of commercially available cation exchange resins, which may be employed to prepare the novel compounds of this invention, include the material designated as "Dowex" 50 sold commercially by Dow Chemical Company, and "Amberlyst" 15 sold commercially by the Rohm & Haas Company. Details of the preferred preparation of the specific compounds falling within the scope of this invention are given in detail hereinafter and are also contained in copending application Ser. No. 428,565, filed simultaneously with the instant application and assigned to the same assignee.

The compounds of this invention can be used per se in much the same manner as commercially available cedar oils are used or when desirable the compounds can be mixed with other materials to provide novel compositions. Such compositions comprise one or a mixture of both of the compounds of this invention and an inert diluent. The amount of novel camphane derivative which may be employed in such compositions may vary in the range of from about 10% to about 90% by weight based on the weight of the composition, depending upon the contemplated end use of the composition, that is, whether the composition is to be used per se or as an additive to another formulation.

A wide variety of inert diluents can be employed to form the compositions of this invention including organic and inorganic liquid, solid and semi-solid inert diluents which are substantially odor free.

Examples of liquid inert diluents include liquid hydrocarbons such as pentane, hexane, nonane, decane and their analogs. Such liquid hydrocarbons may be straight chain, branched chain or cyclic liquid hydrocarbons or mixtures of such hydrocarbons. The novel camphanes of this invention may be dissolved or dispersed in one or more of these liquid hydrocarbons. If desirable a composition may comprise a saturated solution of one or both of the novel camphane derivatives having dispersed therein additional quantities of one or more of these camphane derivatives. Liquid hydrocarbons which have been found to be particularly advantageous are those fractional petroleum distillation products boiling between about 80° to about 120° and sometimes referred to as petroleum ethers or ligroin.

In a particularly advantageous embodiment of this invention a composition comprising from about 10% to about 90% by weight of a camphane derivative of this invention dissolved and/or dispersed in the fourth fraction petroleum distillation product having a density between 0.7 and 0.75 gram per cubic centimeter and boiling within the range of from between 90° to 120° C. (e.g. ligroin) has been found to be useful as an additive to insecticidal sprays which have an unpleasant odor to mask such unpleasant odor and to impart a cedar odor thereto.

Other inert organic diluents include aliphatic alcohols, for example, mono-, di- and tri-hydroxy alcohols. Examples of monohydroxy alcohols which can be employed as liquid inert diluents include methyl, ethyl, n-propyl, isopropyl, butyl, t-butyl, sec-butyl alcohols; examples of dihydroxy alcohols include glycols, for example, ethylene and propylene glycol and the pinacols, for example, compounds having the formula $C_6H_{12}(OH)_2$; examples of polyhydroxy alcohols include glycerol, sorbitol, erythritol, arabitol and the like; liquid aromatic and cyclic alcohols may also be employed provided they are odor free and examples of these alcohols include cyclopentyl and cyclohexyl alcohols.

Although inert liquid aliphatic and aromatic esters and aldehydes may also be employed in the compositions of this invention as liquid inert diluents, these materials are not entirely desirable because they are not usually inert with respect to odor and therefore would tend to compete with, dilute or mask the cedar odor of the compounds of this invention. Therefore, if these materials are used at all, they are usually used in conjunction with odorless liquid inert diluents and comprise only a minor proportion of the liquid diluent components. Still other inert liquid diluents which may be employed include higher boiling liquid hydrocarbon mixtures such as liquid petroleum (sometimes termed mineral oil) and liquid higher alcohols sometimes termed liquid waxes.

Solid inert diluents which can be employed in the compositions of this invention include pulverulent or finely divided inorganic and organic solids. Examples of finely divided solid inert inorganic diluents include finely divided siliceous minerals such as mineral clays, e.g. bentonite, attapulgite, fuller's earth, kaolin, mica, talc, diatomaceous earth, quartz and the like and synthetically prepared siliceous materials such as precipitated silica, fume silica and silica aerogels. By way of example, one embodiment of a composition of this invention comprises from about 10% to about 90% by weight of 2-isopropoxy-camphane and/or 2-(β-hydroxyethoxy)-camphane or mixtures thereof and one or more of the abovementioned finely divided solid inert inorganic diluents.

Examples of finely divided solid organic inert diluents include starch, flour, sugar, powdered sawdust, casein, gelatin, cetyl alcohol and the like. As one example of an advantageous embodiment of a composition from about 2% to about 25% of one or both of the novel compounds of this invention may be admixed with powdered sawdust to provide a sweeping compound. The present invention also contemplates compositions comprising, for example, one or both of the novel camphane derivatives and mixtures of organic and inorganic solid inert diluents.

Semi-solid inert diluents may also be employed in the compositions of this invention. Examples of such semi-solid diluents include petroleum jelly, lanolin, and the like and mixtures of solid and liquid inert diluents such as, for example, mixtures of cetyl alcohol and ligroin. Such compositions comprising semi-solid inert diluents and one or both of the compounds of the present invention have been found to be particularly useful in furniture polishes and similar compositions where a cedar-like odor is desired. Such compositions are also useful in repelling insects such as, for example, the common moth and can be applied as coatings in clothing containers.

The compositions or formulations of this invention embrace liquid, solid and semi-solid compositions depending upon the end use desired. Semi-solid composiitons having controlled consistency may be readily prepared by intimately mixing either 2-isopropoxy-camphane, 2-(β-hydroxyethoxy)-camphane or mixtures thereof with one or more of the solid, liquid and semi-solid inert diluents hereinbefore described. Thus, for example, a composition may comprise a mixture from about 10% to about 50% by weight of 2-isopropoxy-camphane and 2-(β-hydroxyethoxy)-camphane, from about 40% to about 5% by weight of a liquid inert diluent such as ligroin, from about 50% to about 45% by weight of a gel-like solid or semi-solid such as for example cetyl alcohol or Vaseline. Such compositions may be used to prepare abrasive cleaner formulations having a cedar-like odor by merely admixing the above composition with a desired amount of a finely divided solid inert abrasive diluent such as talc, clay, diatomaceous earth and the like.

The following specific examples are intended to illustrate the invention but not to limit the scope thereof, parts and percentages being by weight unless otherwise specified.

EXAMPLE 1

The preparation of 2-isopropoxy-camphane

To a reaction zone there was added 100 grams of camphene, 130 grams of isopropanol and 20 grams of "Amberlyst" 15, an acidic nuclear sulfonic cation exchange resin based on a styrene-divinyl benzene copolymer and in the hydrogen form and having a highly porous (macro reticulated) structure described in "Industrial and Engineering Chemistry, Product Research and Development," vol. I, No. 2, pages 140–144, in 1962, commercially available from Rohm & Haas Company, Philadelphia, Pa. The contents of the reaction zone were stirred with a mechanistirrer and heated to and maintained at a temperature of 84°, ±2° C. The stirring was continued at the above temperature for 24 hours after which the liquid reaction product was decanted from the ion exchange resin and fractionally distilled at reduced pressure to yield the following distillate fractions: Forty-nine and two-tenths grams of substantially pure 2-isopropoxy-camphane were obtained along with 50 grams of isopropanol, 25.6 grams camphene and 30.4 grams of a mixture of camphene and 2-isopropoxy-camphane. The boiling point of the pure 2-isopropoxy-camphane was determined at 100 mm. pressure and found to be 138° C. and the specific gravity was determined at 0.882. The index of refraction of the compounds was also determined at 1.4538 ($n_{15}$). An infrared absorption pattern was determined using the apparatus and procedure described in "Instruction Manuals," 990–9000–1, The Perkin-Elmer Corp., Norwalk, Conn., and found to be that set forth in FIG. 1. The pure material had a pronounced cedar-like odor in contrast to the n-propoxy-camphane which had a camphor/banana-like odor.

EXAMPLE 2

Preparation of 2(β-hydroxyethoxy)-camphane

To a reaction vessel there was added 100 grams of camphene, 91 grams of ethylene glycol, 88 grams of acetone and 30 grams of "Amberlyst" 15, the acidic anion exchange resin employed in Example 1. The contents of the reaction vessel were stirred with a mechanical stirrer and heated to and maintained at 74°, ±2° C. The stirring was continued at the above temperature for 60 hours after which the liquid reaction product was separated from the ion exchange resin by filtration and was fractionally distilled between temperatures of 45–120° C. and between pressures of 100–0.2 mm. to yield the following distillate fractions: 69 grams of substantially pure 2-(β-hydroxyethoxy)-camphane, 55 grams of acetone, 23 grams of ethylene glycol, 17 grams of camphene and 17 grams of a mixture consisting substantially of camphene and 2-(β-hydroxyethoxy)-camphane. The boiling point of the pure 2-(β-hydroxyethoxy)-camphane was determined at 10 mm. pressure and found to be 121° C. The specific gravity of the product was determined to be 0.990 at 25° C. and the index of refraction was determined and found to be 1.480 at 15° C. Infrared absorption pattern was determined using the apparatus and procedure described in Example 1 and found to be that set forth in FIG. 2. The pure material had a pronounced cedar-like odor in contrast to the 2-ethoxy-camphane which had a camphoraceous odor.

Although the compounds of this invention may be prepared by reacting camphene and alcohol in the presence of mineral acids, the procedures set forth in the foregoing examples are preferred methods of preparation.

EXAMPLE 3

The following five liquid compositions were prepared by dispersing 2-isopropoxy-camphane in the quantities indicated in the below-listed liquid inert diluents:

TABLE I

| Ingredients | Composition Number ||||| 
|---|---|---|---|---|---|
| | 1 | 2 | 3 | 4 | 5 |
| | Percent |||||
| 2-isopropoxy-camphane | 20 | 25 | 30 | 20 | 10 |
| 2-(β-hydroxyethoxy)-camphane | | | | | 10 |
| Ligroin | 80 | | | | 40 |
| Ethyl Alcohol | | 75 | | | |
| Mineral Oil | | | 70 | | 40 |
| Isopropyl Alcohol | | | | 80 | |

The foregoing compositions were useful in imparting a cedar odor to products such as furniture polishes, paint, soaps, insect repellents, dog repellents, disinfectants, shoe dressings, floor and auto waxes and as sprays to mask cooking odors.

EXAMPLE 4

The following five liquid compositions were prepared by dispersing 2 - (β - hydroxyethoxy)-camphane in the quantities indicated in the below-listed inert diluents:

TABLE II

| Ingredients | Composition Number | | | | |
|---|---|---|---|---|---|
| | 6 | 7 | 8 | 9 | 10 |
| | Percent | | | | |
| 2-(β-hydroxyethoxy)-camphane | 10 | 20 | 30 | 20 | 20 |
| Ligroin | 90 | | | | 40 |
| Ethyl Alcohol | | 80 | | | |
| Mineral Oil | | | 70 | | 40 |
| Isopropyl Alcohol | | | | 80 | |

The foregoing compositions were useful in imparting a cedar odor to products such as furniture polishes, paint, soaps, insect repellents, dog repellents, disinfectants, shoe dressings, floor and auto waxes and as sprays to mask cooking odors.

EXAMPLE 5

The following solid compositions were prepared by intimately admixing the indicated quantities of 2-isopropoxy-camphane with the inert solid diluents listed below:

TABLE III

| Ingredients | Compoistion Number | | | | |
|---|---|---|---|---|---|
| | 11 | 12 | 13 | 14 | 15 |
| | Percent | | | | |
| 2-isopropoxy-camphane | 20 | 30 | 20 | 25 | 20 |
| Bentonite | 80 | | | | 40 |
| Powdered Talc | | 70 | | | 40 |
| Fume Silica | | | 80 | | |
| Silica Aerogel | | | | 75 | |

The foregoing compositions were useful in imparting cedar odor to products such as abrasive cleaners, insecticides, disinfectants, mechanics' hand-soaps and window cleansers.

EXAMPLE 6

The following solid compositions were prepared by intimately admixing the indicated quantities of 2-(β-hydroxyethoxy)-camphane with the inert solid diluents listed below:

TABLE IV

| Ingredients | Composition Number | | | | |
|---|---|---|---|---|---|
| | 16 | 17 | 18 | 19 | 20 |
| | Percent | | | | |
| 2-(β-hydroxyethoxy)-camphane | 20 | 20 | 20 | 20 | 20 |
| Bentonite | 80 | | | | 40 |
| Powdered Talc | | 80 | | | 40 |
| Fume Silica | | | 80 | | |
| Silica Aerogel | | | | 80 | |

The foregoing compositions were useful in imparting cedar odor to products such as abrasive cleaners, insecticides, disinfectants, mechanics' hand-soaps and window cleansers.

EXAMPLE 7

The following semi-solid compositions were prepared by intimately admixing the indicated amounts of 2-isopropoxy-camphane with one or more of the ingredients listed below:

TABLE V

| Ingredients | Composition Number | | | | |
|---|---|---|---|---|---|
| | 21 | 22 | 23 | 24 | 25 |
| | Percent | | | | |
| 2-isopropoxy-camphane | 20 | 20 | 20 | 20 | 20 |
| Cetyl Alcohol | 30 | 40 | 50 | 60 | 70 |
| Ligroin | 5 | 5 | 5 | 5 | 10 |
| Talc | 40 | 30 | 20 | 10 | 0 |
| Ethyl Alcohol | 5 | 5 | 5 | 5 | 0 |

The above compositions were useful as additives to insecticidal sprays for the purpose of masking the odors of such sprays.

EXAMPLE 8

The following semi-solid compositions were prepared by intimately admixing the indicated amounts of 2-(β-hydroxyethoxy)-camphane with one or more of the ingredients listed below:

TABLE VI

| Ingredients | Composition Number | | | | |
|---|---|---|---|---|---|
| | 26 | 27 | 28 | 29 | 30 |
| | Percent | | | | |
| 2-(β-hydroxyethoxy)-camphane | 20 | 20 | 20 | 20 | 20 |
| Cetyl Alcohol | 30 | 40 | 50 | 60 | 70 |
| Ligroin | 5 | 5 | 5 | 5 | 5 |
| Talc | 40 | 30 | 20 | 10 | 0 |
| Ethyl Alcohol | 5 | 5 | 5 | 5 | 5 |

The above compositions were useful as additives to floor waxes and furniture polishes for the purpose of masking the odors of such formulations.

What is claimed is:

1. A compound of the formula:

$$\begin{array}{c} CH_3 \\ | \\ C \\ H_2C \diagup \diagdown C-O-R \\ CH_3-C-CH_3 \quad | \\ H_2C \diagdown \diagup CH_2 \\ C \\ | \\ H \end{array}$$

where —R is selected from the group consisting of $$\begin{array}{cc} H & \\ H-C-H & H \; H \\ | & | \; | \\ -C-H \; \text{and} \; -C-C-OH \\ | & | \; | \\ H-C-H & H \; H \\ | & \\ H & \end{array}$$

2. 2-isopropoxycamphane
3. 2-(β-hydroxyethoxy)-camphane

References Cited

UNITED STATES PATENTS

| 2,182,826 | 12/1939 | Sheffield | 260—611 |
| 2,350,147 | 5/1944 | Borglin | 260—611 |
| 2,360,898 | 10/1944 | Sarbach | 260—611 X |
| 2,581,916 | 1/1952 | Kitchen | 260—611 |

FOREIGN PATENTS 817,836   5/1937   France.

BERNARD HELFIN, *Primary Examiner.*